Figure 1:
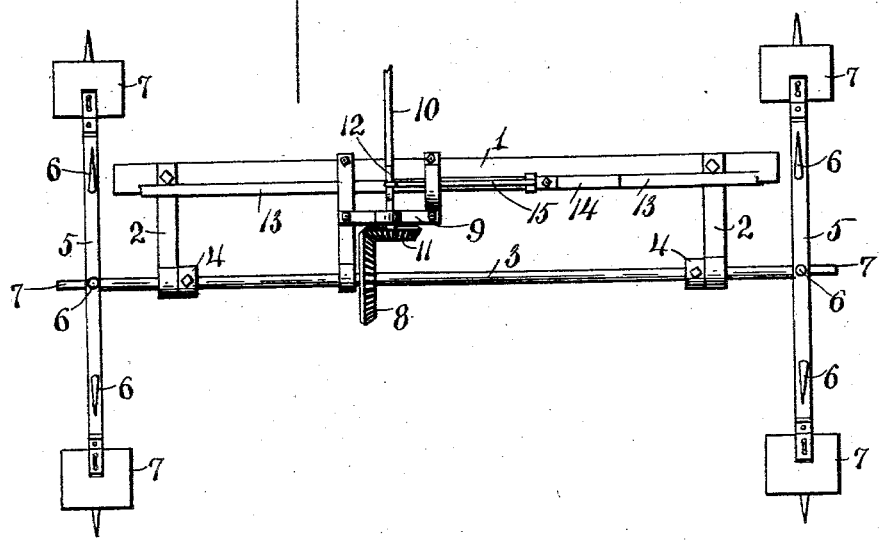

No. 633,942. Patented Sept. 26, 1899.
R. E. ASH & T. J. McCOLLOUCH.
DROPPER ATTACHMENT FOR CORN PLANTERS.
(Application filed June 18, 1897.)
(No Model.) 2 Sheets—Sheet 1.

Witnesses
W. E. Allen.
Victor J. Evans

Richard E. Ash.
and T. J. McCollouch. Inventors
by John Wedderburn
Attorney

No. 633,942. Patented Sept. 26, 1899.
R. E. ASH & T. J. McCOLLOUCH.
DROPPER ATTACHMENT FOR CORN PLANTERS.
(Application filed June 18, 1897.)
(No Model.) 2 Sheets—Sheet 2.
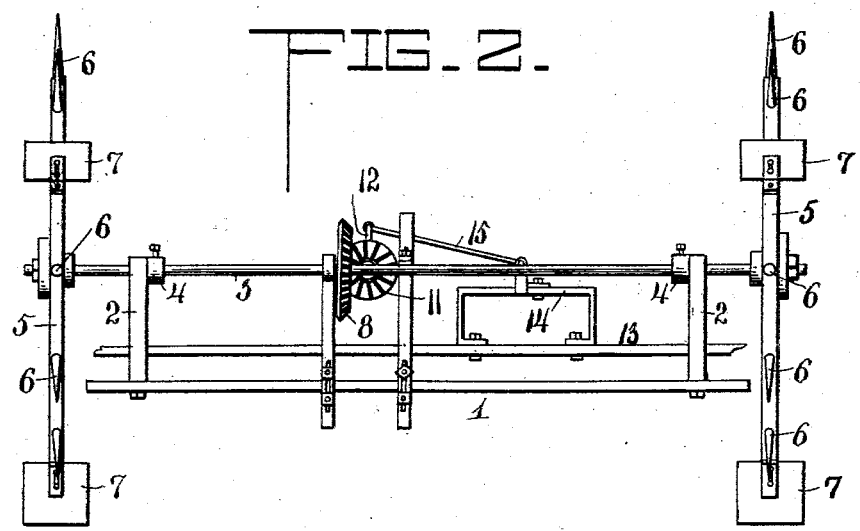
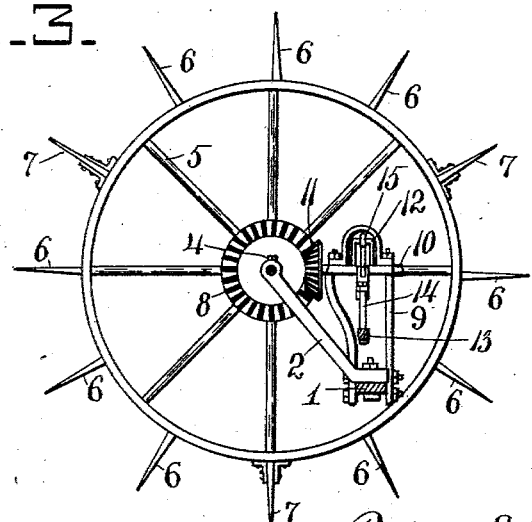

UNITED STATES PATENT OFFICE.

RICHARD E. ASH AND THOMAS J. McCOLLOUCH, OF NEVADA, MISSOURI.

DROPPER ATTACHMENT FOR CORN-PLANTERS.

SPECIFICATION forming part of Letters Patent No. 633,942, dated September 26, 1899.

Application filed June 18, 1897. Serial No. 641,390. (No model.)

*To all whom it may concern:*

Be it known that we, RICHARD E. ASH and THOMAS J. McCOLLOUCH, of Nevada, in the county of Vernon and State of Missouri, have invented certain new and useful Improvements in Dropper Attachments for Corn-Planters; and we do hereby declare the following to be a full, clear, and exact description of the invention, such as will enable others skilled in the art to which it appertains to make and use the same.

Our invention relates to corn-planters; and its object is to provide a corn-planter that will operate without wire, chain, or rope, which will mark every hill when dropped, which will enable the driver to start from any place in the field, and which, when the dropping mechanism is raised, is thrown entirely out of gear.

Our invention consists of certain novel features of construction and combinations of parts hereinafter fully described and claimed.

In the accompanying drawings, Figure 1 is a top plan view of our device. Fig. 2 is a rear view thereof, and Fig. 3 is a side elevation thereof.

The numeral 1 indicates the back bar of a corn-planter, which is of known construction and is provided with the usual means for raising and lowering the same (not shown) in connection with the other mechanism that is usually raised from the ground when the planter is in operation—*i. e.*, the furrow-openers, &c. Brackets 2, loosely supported upon shaft 3, support or carry the back bar 1. Collars 4 serve to retain this shaft in the proper position. Walking-wheels 5, provided with traction-spikes 6 and markers 7, are held upon said shaft, being securely keyed thereto. A bevel-gear 8 is also held upon said shaft at about the middle point thereof. A frame 9 supports a shaft 10. A bevel-gear 11 is mounted upon the shaft 10 to mesh with the bevel-gear 8. A crank 12 is formed upon this shaft. The dropper-bar 13 of the machine has attached thereto a projection 14. A pitman 15 connects said projection to said crank. It will now be obvious that as the machine is drawn forward the walking-wheels will rotate the gear, and thus actuate the dropper mechanism. By suitable change-gears this may be regulated to give a stroke any definite number of times during the revolution of the walking-wheels.

This attachment is adapted to be used upon any corn-planter and is intended to take the place of the ordinary mechanism. In order to apply said attachment, all the ordinary mechanism operating the check-rower is removed. The attachment is then placed on the cross-bar and the projecting bar secured to the dropping-bar.

When it is desired to use the machine, the driver assumes his seat and takes the desired position in the field, adjusts our attachment to working position, and crosses the field. He then turns around and drives to the proper position from the row just planted. During this turning the attachment is of course raised. When he has gotten to the proper place, he turns one of the walking-wheels, which is readily done from his seat, until the marker thereon points directly down and is parallel with the last two hills planted. The attachment is then dropped and the process continued. Should the driver meet an obstruction in the field, a similar process is adopted.

It is obvious that many minor changes may be made in the form of our device without departing from the material principles thereof. We do not therefore desire to confine ourselves to the exact form herein shown and described, but wish to include all such as properly come within the scope of our invention.

Having thus described our invention, what we claim as new, and desire to secure by Letters Patent, is—

A corn-planter attachment consisting of the combination of a pair of walking-wheels having traction-spikes and space-markers, an axle or shaft to which said walking-wheels are keyed, brackets having bearings for the axle for coupling the axle with the back bar of a planter, a beveled gear keyed to the shaft, a frame for attachment to the planter, a crank-shaft mounted in said frame, a pinion on the crank-shaft intermeshing with the beveled gear on the walking-wheel shaft, and a pitman coupled at one end with the crank-shaft and adapted for connection at the other end with the dropper-bar carried by the planter, substantially as described.

In testimony whereof we have signed this specification in the presence of two subscribing witnesses.

RICHARD E. ASH.
T. J. McCOLLOUCH.

Witnesses:
JOHN L. BIRDSEY,
JOHN B. HARRIS.